(12) United States Patent
Jonsson et al.

(10) Patent No.: US 9,029,456 B2
(45) Date of Patent: May 12, 2015

(54) METHOD FOR MAKING CEMENTED CARBIDE PRODUCTS

(75) Inventors: Per Jonsson, Fors (SE); Mattias Puide, Vasteras (SE)

(73) Assignee: SECO TOOLS AB, Fagersta (SE)

( * ) Notice: Subject to any disclaimer, the term of this patent is extended or adjusted under 35 U.S.C. 154(b) by 863 days.

(21) Appl. No.: 13/201,951

(22) PCT Filed: Feb. 16, 2010

(86) PCT No.: PCT/SE2010/050177
§ 371 (c)(1),
(2), (4) Date: Aug. 17, 2011

(87) PCT Pub. No.: WO2010/096003
PCT Pub. Date: Aug. 26, 2010

(65) Prior Publication Data
US 2011/0301284 A1    Dec. 8, 2011

(30) Foreign Application Priority Data

Feb. 18, 2009  (SE) ...................................... 0950086

(51) Int. Cl.
C08K 5/01 (2006.01)
C22C 29/08 (2006.01)
C22C 1/05 (2006.01)
C22C 29/04 (2006.01)

(52) U.S. Cl.
CPC .................. C22C 29/08 (2013.01); C22C 1/051 (2013.01); C22C 29/04 (2013.01); *B22F 2999/00* (2013.01)

(58) Field of Classification Search
USPC .................................. 524/476, 477, 490, 570
See application file for complete search history.

(56) References Cited

U.S. PATENT DOCUMENTS

| 4,908,340 | A | * | 3/1990 | Frechette et al. ............ 501/95.2 |
| 5,809,848 | A | | 9/1998 | Viswanadham et al. |
| 2002/0178862 | A1 | * | 12/2002 | Smith et al. ..................... 75/236 |
| 2003/0084752 | A1 | | 5/2003 | Anderson |
| 2008/0120889 | A1 | | 5/2008 | Bose et al. |

FOREIGN PATENT DOCUMENTS

| DE | 1 433 072 A1 | 12/1968 |
| DE | 217533 A * | 1/1985 |
| EP | 0 543 375 A1 | 5/1993 |
| GB | 941946 A | 11/1963 |
| JP | 56079194 A * | 6/1981 |
| WO | 98/18973 A1 | 5/1998 |

OTHER PUBLICATIONS

Derwent English abstract of DD 217533 A, 1985.*
Translation of JP 56079194 A, 1981.*
Translation of DD217533, 1983.*
International Search Report dated, Jun. 15, 2010, from corresponding PCT application.
Supplemental European Search Report, dated Oct. 16, 2014, from corresponding EP application.

* cited by examiner

*Primary Examiner* — Wenwen Cai
(74) *Attorney, Agent, or Firm* — Young & Thompson

(57) ABSTRACT

The invention relates to a method for making cemented carbide or cermet parts, comprises mixing a binder system with cemented carbide powder or cermet powder to form a feedstock, and injection molding or extruding the feedstock to form the cemented carbide or cermet parts, wherein the binder system comprises 30-60 wt % olefinic polymers, 40-70 wt % waxes, and 2.5-10 wt % petroleum jelly CAS 8009-03-8, the feedstock has a solids loading of $\phi=0.54$-$0.56$.

4 Claims, No Drawings

METHOD FOR MAKING CEMENTED CARBIDE PRODUCTS

BACKGROUND OF THE INVENTION

1. Field of the Invention

The present invention relates to a method for the production of tungsten carbide based hard metal tools or components using the powder injection moulding or extrusion method and a binder system therefore.

2. Description of the Related Art

Hard metals based on tungsten carbide are composites consisting of small (μm-scale) grains of at least one hard phase in a binder phase. These materials always contain the hard phase tungsten carbide (WC). In addition, other metal carbides with the general composition (Ti,Nb,Ta,W)C may also be included, as well as metal carbonitrides, e.g., Ti(C,N). The binder phase usually consists of cobalt (Co). Other binder phase compositions may also be used, e.g., combinations of Co, Ni, and Fe, or Ni and Fe.

Industrial production of tungsten carbide based hard metals often includes blending of given proportions of powders of raw materials and additives in the wet state using a milling liquid. This liquid is often an alcohol, e.g., ethanol or water or a mixture thereof. The mixture is then milled into homogeneous slurry. The wet milling operation is made with the purpose of deagglomerating and mixing the raw materials intimately. Individual raw material grains are also disintegrated to some extent. The obtained slurry is then dried and granulated, e.g. by means of a spray dryer. The granulate thus obtained may then be used in uni-axial pressing of green bodies or for extrusion or injection moulding.

Injection moulding is common in the plastics industry, where material containing thermoplastics or thermosetting polymers are heated and forced into a mould with the desired shape. The method is often referred to as Powder Injection Moulding (PIM) when used in powder technology. The method is preferably used for parts with complex geometry. In powder injection moulding of tungsten carbide based hard metal parts, four consecutive steps are applied:

1. Mixing of the granulated cemented carbide powder with a binder system. The binder system acts as a carrier for the powder and constitutes 25-60 volume % of the resulting material, often referred to as the feedstock. The exact concentration is dependent on the desired process properties during moulding. The mixing is made with all organic constituents in molten state. The resulting feedstock is obtained as pellets of approximate size 4×4 mm.

2. Injection moulding is performed using the mixed feedstock. The material is heated to 100-240° C. and then forced into a cavity with the desired shape. The thus obtained part is cooled and then removed from the cavity.

3. Removing the binder from the obtained part. The removal can be obtained by extracting of the parts in a suitable solvent and/or by heating in a furnace with a suitable atmosphere. This step is often referred to as the debinding step.

4. Sintering of the parts. Common sintering procedures for cemented carbides are applied.

Extrusion of the feedstock comprises steps 1, 3 and 4 above. Instead of forcing the feedstock into a cavity of the desired shape, the feedstock is continuously forced through a die with the desired cross section.

The solids loading, $\phi$, of the feedstock is the volumetric amount of hard constituents, compared to the organic constituents. $\phi$ can be calculated using the following equation:

$$\phi = \frac{\rho_f - \rho_v}{\rho_s - \rho_v}$$

where $\rho_s$ is the density of the cemented carbide as sintered, $\rho_v$ is the mean density of the organic constituents and $\rho_f$ is the density of the feedstock, measured with a helium pycnometer.

In the case of having a low solids loading of the feedstock, $\phi$, problems with cracks, voids, blisters and distorted parts may occur. In the case of having a high solids loading, $\phi$, problems with mould filling, extended mould wear, weld lines, which may open during sintering, forming cracks and surface defects due to too high viscosity as well as mould release problems may occur.

SUMMARY OF THE INVENTION

It has now surprisingly been found that by replacing a small amount of the organic constituent of the feedstock with petroleum jelly (CAS 8009-03-8), a high solids loading can be allowed without experiencing the problems mentioned.

The method according to the present invention comprises the following steps:

1) Wet milling of the raw materials in water or alcohol or a combination thereof, preferably 80 wt-% ethanol, and 20 wt-% water, together with 0.1-1.2 wt-%, preferably 0.25-0.55 wt-% carboxylic acid, preferably stearic acid, as a granulating agent for the subsequent drying. More carboxylic acid is required the smaller the grain size of the hard constituents.

2) Drying of the slurry formed during the above mentioned wet milling process step.

3) Mixing the dried powder by kneading with a binder system, consisting of 30-60 wt-% olefinic polymers, 40-70 wt-% waxes and 2.5-10 wt-% petroleum jelly to a solids loading of 0=0.54-0.56. The mixing is performed in a batch mixer or twin screw extruder, heated to 50-200° C. that forms pellets with a size of approximately 4×4 mm.

4) Injection moulding of the feedstock in a conventional injection moulding machine. Alternatively, the feedstock is extruded in a single screw, twin screw or plunge type extruder. The material is heated to 100-240° C., preferably 140-160° C., and then, in the case of injection moulding, forced into a cavity with the desired shape. In extrusion, the material is forced through a die with the desired cross section. The part obtained in injection moulding is cooled and then removed from the cavity. The extrudates are cut in pieces of desired length.

5) Debinding the obtained part. The debinding is performed in two steps.

5a) By extraction of the wax and petroleum jelly in an apolar solvent, at 31-70° C., preferably at 31-55° C. It is within the purview of the skilled artisan to determine by experiments the conditions necessary to avoid the formation of cracks and other defects according to this specification.

5b) By heating in a furnace, preferably in a flowing gaseous medium atmosphere at 2 mbar to atmospheric pressure up to 450° C. It is within the purview of the skilled artisan to determine by experiments the conditions necessary to avoid the formation of cracks and other defects according to this specification.

6) Presintering of the part in a debinding furnace in vacuum at 900-1250° C., preferably at about 1200° C.

7) Sintering of the parts using conventional sintering technique.

The invention can be used for all compositions of cemented carbide and all WC grain sizes commonly used as well as for titanium carbonitride based materials.

In one embodiment the WC or Ti(C,N) grain size shall be 0.2-1.5 μm with conventional grain growth inhibitors.

In another embodiment the WC or Ti(C,N) grain size shall be 1.5-4 μm.

The invention also relates to a binder system for injection moulding or extrusion of cemented carbide or cermet parts, comprising 30-60 wt-% olefinic polymers, 40-70 wt-% waxes and 2.5-10 wt-% petroleum jelly (CAS 8009-03-8).

DETAILED DESCRIPTION OF THE INVENTION

Example 1

A WC-13 wt-% Co submicron cemented carbide powder was made by wet milling 390 g Co-powder (OMG extra fine), 19.33 g Cr3C2 (H C Starck), 2580.5 g WC (H C Starck DS80), 10.22 g W metal powder, 8 g Fisher-Tropsch wax (Sasol H1) and 11 g stearic acid in 0.8 l milling liquid consisting of ethanol and water (80:20 by weight) for 40 h. The stearic acid is added in this stage of the process to work as a granule forming agent, when spray drying the slurry. The resulting slurry was spray-dried to a granulated powder.

Example 2

Comparative

The powder made in Example 1 was mixed by kneading 2500 g powder from Example 1 with 50.97 g Polypropylene-polyethylene copolymer (RD360 MO, Borealis) and 50.97 g Paraffin wax (Sasol Wax) in a Z-blade kneader mixer (Werner & Pfleiderer LUK 1,0). This resulted in a feedstock with a density of 8.23 g/ml, corresponding to a φ of 0.553.

Example 3

Invention

The powder made in Example 1 was mixed by kneading 2500 g powder from Example 1 with 50.97 g Polypropylene-polyethylene copolymer (RD360 MO, Borealis) and 45.87 g Paraffin wax (Sasol Wax) and 5.06 g petroleum jelly (Merkur VARA AB) in a Z-blade kneader mixer (Werner & Pfleiderer LUK 1,0). This resulted in a feedstock with a density of 8.23 g/ml, corresponding to a φ of 0.553.

Example 4

Comparative

The feedstock made in example 2 was fed into an injection moulding machine (Battenfeld HM 60/130/22). The machine was used for the injection moulding of a Seco Tools Minimaster 10 mm endmill green body. The injection pressure was 62 MPa at an injection speed of 37 ml/s. The green bodies had a dry looking surface and weld lines visible to the naked eye.

Example 5

Invention

The feedstock made in example 3 was fed into an injection moulding machine (Battenfeld HM 60/130/22). The machine was used for the injection moulding of a Seco Tools Minimaster 10 mm endmill green body. The injection pressure was 58 MPa at an injection speed of 37 ml/s. The green bodies had a shiny looking surface and no weld lines visible to the naked eye.

Example 6

Comparative

The parts from example 4 were debound by extraction and sintered in a Sinter-HIP furnace (PVA COD733R) at 1420° C. with a total soaking time of 60 min. After 30 min at the peak hold temperature, the furnace pressure was raised to 3 MPa Ar.

After sintering, the parts were cut for inspection. The parts from example 4 were free from carbon pores, eta-phase and pores, i.e. A00 B00 C00 according to ISO 4505. A few of the parts showed cracks, probably developed from the weld lines.

Example 7

Invention

The parts from example 5 were debound by extraction and sintered in a Sinter-HIP furnace (PVA COD733R) at 1420° C. with a total soaking time of 60 min. After 30 min at the peak hold temperature, the furnace pressure was raised to 3 MPa Ar.

After sintering, the parts were cut for inspection. The parts from example 5 were free from carbon pores, cracks, eta-phase and pores, i.e. A00 B00 C00 according to ISO 4505.

The invention claimed is:

1. A method for making cemented carbide or cermet parts, comprises mixing a binder system with cemented carbide powder or cermet powder to form a feedstock, and injection molding or extruding the feedstock to form the cemented carbide or cermet parts, wherein the binder system comprises 30-60 wt % olefinic polymers, 40-70 wt % waxes, and 2.5-10 wt % petroleum jelly CAS 8009-03-8, the feedstock has a solids loading of φ=0.54-0.56.

2. A binder system comprises 30-60 wt % olefinic polymers, 40-70 wt % waxes, and 2.5-10 wt % petroleum jelly CAS 8009-03-8, wherein the binder system is used to make cemented carbide or cermet parts by injection molding or extrusion.

3. The binder system according to claim 2, wherein the olefinic polymers comprise polypropylene-polyethylene copolymer.

4. The binder system according to claim 2, wherein the waxes comprise paraffin wax.

* * * * *